*Birch & Snowden,*
*Grinding Circular Saws.*
N° 70,788. Patented Nov. 12, 1867.
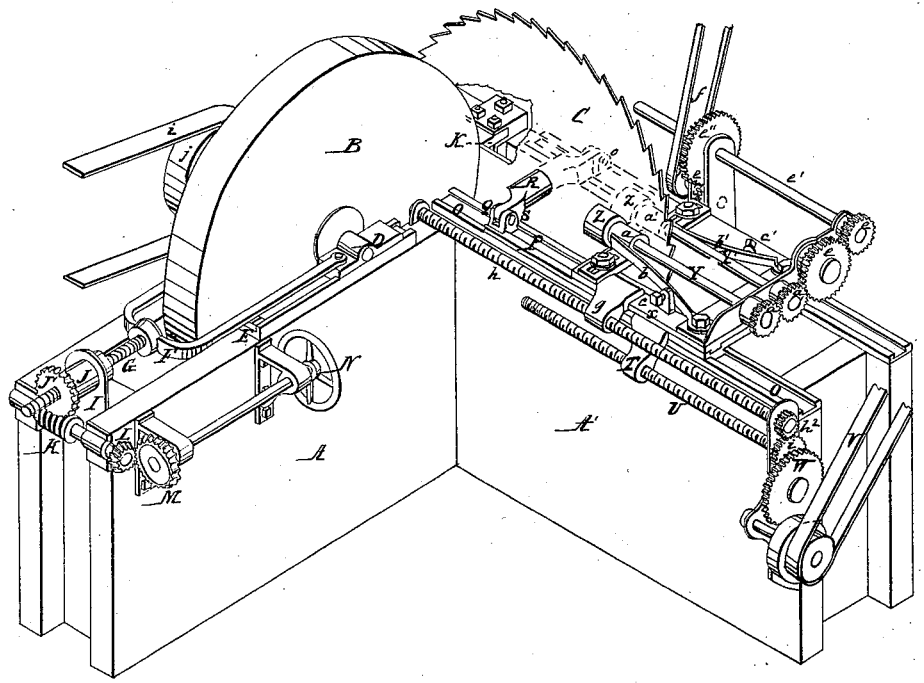
Witnesses:
Inventors:

United States Patent Office.

THOMAS BIRCH, OF COVINGTON, KENTUCKY, AND ADAM SOWDEN, OF CINCINNATI, OHIO, ASSIGNORS TO RITTER, HOGAN, AND SOWDEN, OF CINCINNATI, OHIO.

Letters Patent No. 70,788, dated November 12, 1867.

IMPROVEMENT IN GRINDING MACHINE FOR CIRCULAR SAWS.

The Schedule referred to in these Letters Patent and making part of the same.

TO WHOM IT MAY CONCERN:

Be it known that we, THOMAS BIRCH, of Covington, Kenton county, Kentucky, and ADAM SOWDEN, of Cincinnati, Hamilton county, Ohio, have invented a new and useful Machine for Grinding Circular Saws; and we do hereby declare the following to be a full, clear, and exact description thereof, reference being had to the accompanying drawing, making part of this specification.

Our invention relates to a device for grinding circular saws to a uniform thickness and true plane.

A machine embodying our invention is represented by an isometric view, the frame consisting of two principal parts A A', and supporting at right angles to each other a grindstone, B, and the saw C, which it is desired to grind. The grindstone journals rest in carriages, of which one, D, is seen, and which are guided toward and from the stuff in ways (one, E, seen,) attached to the portion A of the frame. A forked rod, F, extending from said boxes terminates in a screw-threaded stem, G, which occupies a nut, J, journalled in a bearing, I, upon the frame, and terminating with a pinion, J', which gears in a worm, K, connected by mitred gearing L M with a hand-wheel, N, convenient to the grinder. The portion A' of the frame supports a bed or guide, O, for a carriage, P, having lugs Q for the ends of a bent axle, R, which, being temporarily inserted through the eye of the saw, support the same for grinding. The bent axle R, having been inserted in a saw to be ground, is, for the time being, made fast to the lugs Q by means of bolts S, or otherwise. Projecting from the carriage P is a nut, T, which receives a screw, U, that is slowly rotated by a belt, V, or other driver through the medium of multiplying gearing W. Resting upon and guided in the carriage P is a secondary carriage, X, which affords journal bearing for the shafts Y Y' of two friction-pulleys Z Z, whose forward ends being journalled in sliding boxes $a$ $a'$, are pressed laterally toward opposite sides of the saw by strong springs $b$ $b'$, whose tension is regulated by means of set-screws $c$ $c'$. The rear ends of the driving-pulley shafts Y Y' have match pinions $d$ $d'$, one of which ($d'$) drives the other, and is itself driven by a train of speed-gearing, $e$, whose feathered shaft $e'$ slides within and is driven by a spur-wheel, $e''$, in stationary bearings, and is propelled by a belt, $f$, or otherwise. Projecting from the carriage is a nut, $g$, which takes a screw, $h$, having a pinion, $h^2$, of half the diameter of the wheel $i$ on the screw U, so as to be driven with twice the velocity of the latter, and consequently causing the carriage X to travel forward or backward simultaneously with the carriage P, but with twice the velocity of the latter, so that as the horizontal feed or motion of the saw brings the grindstone to a part of its disk more or less distant from the centre, the driving-pulleys are brought automatically to a corresponding distance from said centre, on the opposite side thereof, so that whether the grinding action be occurring at a less or greater distance from the saw's centre, the rotation of the particular zone being operated upon shall be of necessity at a uniform velocity, which could not be the case if the driving-pulleys remained at an unchangeable distance from the centre, while the radial distance of the point of contact of the saw was constantly changing. The grindstone is driven at a high velocity by means of a belt, $i'$, or otherwise, to about twenty-six times the velocity of rotation of the saw. These velocities may be varied to suit the views of individual operators, and the kind of work to be done. We have obtained good results by a speed of ninety-two feet per minute for the peripheries of the driving-friction pulleys Z Z', and two thousand four hundred feet per minute for that of the grindstone. Firmly secured to the frame A', on the opposite side of the saw to the grindstone, is a stationary stop or abutment, $k$, of the hardest cast steel.

We have selected for illustration the preferred form or type of our invention, but do not propose to restrict ourselves thereto so long as the results are attained by means substantially equivalent. For example, the nut J may be provided with a hand-wheel, and be operated without the intervention of the worm K and gearing L M, and the screws U and $h$ may be operated by a hand-wrist or wheel on one of them, instead of by the automatic attachment V W. The screws U and $h$ may be connected by match gearing, and the unequal speeds of the carriages P and X be secured by unequal pitches of said screws, or the said carriages may be driven at unequal speeds by means of racks and pinions, or of endless chains.

We are aware that saws have been so driven in the act of grinding as to preserve an equal speed at all points of actual contact with the grindstone, but such, so far as known to us, have always the driving-pulley or roller on the rear side of the saw immediately opposite to the stone, and have thus depended for action on the pressure of the stone itself, which would vary with the thin or thick places of the stuff, causing the saw to lag at the former and to run forward without grinding at the latter places—defects inherent and unavoidable in this mode, because, the object being to reduce the saw to a definite and uniform thickness, the relative distance of the grindstone and the roller or abutment on the rear of the saw must be unchangeable.

We are also aware that saws have been driven in the act of grinding, by means of friction-pulleys, independently of and having a different point of contact to the grindstone, but such have, so far as known, always maintained a certain unchangeable distance from the saw-centre during the action of the grindstone.

We claim herein as new, and of our invention—

1. The provision, in a machine for grinding circular saws, of a pair of driving-friction pulleys, adapted to grasp the saw at a shifting point diametrically opposite, or nearly so, to the point of impact of the grindstone, and having a corresponding approach toward and recession from the saw's centre in the act of grinding, substantially as and for the purpose set forth.

2. The arrangement of the saw-carriage and driving-pulley carriage, caused to automatically advance and recede with unequal velocities in paths parallel to the grindstone's axis, for the purpose explained.

3. The arrangement of the paired friction driving-pulleys $Z\ Z'$, made to grasp the saw on opposite sides thereof by means of pressing-springs $b\ b'$, and set-screws $c\ c'$, for the purpose set forth.

4. In combination with the said friction driving-pulleys and accessories, we claim the arrangement of travelling-gearing and shaft $Y\ Y'$, $e\ e\ e'$, and stationary gearing $e''$, as represented.

In testimony of which invention we hereunto set our hands.

THOMAS BIRCH,
ADAM SOWDEN.

Witnesses:
 GEO. H. KNIGHT,
 JAMES H. LAYMAN